United States Patent
Macpherson et al.

(10) Patent No.: US 6,473,959 B1
(45) Date of Patent: Nov. 5, 2002

(54) METHOD FOR LATCHING A DISC DRIVER ACTUATOR

(75) Inventors: Aaron S. Macpherson, Fort Collins, CO (US); Gary F. Kelsic, Longmont, CO (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/476,603

(22) Filed: Dec. 31, 1999

Related U.S. Application Data

(60) Provisional application No. 60/132,993, filed on May 7, 1999.

(51) Int. Cl.$^7$ .............................. H01F 7/06; G11B 5/54
(52) U.S. Cl. ................ 29/602.1; 29/603.03; 29/603.01; 360/256; 360/256.2
(58) Field of Search .................... 29/602.1, 607, 29/603.03, 603.01, 596, 464; 360/256.2, 256, 97.01; 335/207; 292/251.5; 310/43, 46

(56) References Cited

U.S. PATENT DOCUMENTS

| | | | |
|---|---|---|---|
| 2,844,402 A | * 7/1958 | Hughes | ................ 292/251.2 |
| 4,985,793 A | 1/1991 | Anderson | |
| 5,023,736 A | 6/1991 | Kelsic et al. | |
| 5,025,335 A | * 6/1991 | Stefansky | ................ 360/97.01 |
| 5,124,867 A | 6/1992 | Kitahori et al. | |
| 5,170,300 A | 12/1992 | Stefansky | |
| 5,224,000 A | 6/1993 | Casey et al. | |
| 5,291,355 A | 3/1994 | Hatch et al. | |
| 5,319,511 A | 6/1994 | Lin | |
| 5,363,261 A | 11/1994 | Eckberg et al. | |
| 5,541,792 A | 7/1996 | Kinosita et al. | |
| 5,581,424 A | 12/1996 | Dunfied et al. | |
| 5,717,548 A | 2/1998 | Koester et al. | |
| 5,782,512 A | * 7/1998 | Cargnoni | ................ 292/251.5 |
| 5,793,572 A | 8/1998 | Lalouette et al. | |
| 5,801,904 A | 9/1998 | Kinosthita et al. | |
| 5,805,384 A | 9/1998 | Bronshvatch et al. | |
| 5,808,384 A | 9/1998 | Bronshvatch et al. | |

FOREIGN PATENT DOCUMENTS

JP          6-22530        1/1994        ................ 335/207

OTHER PUBLICATIONS

Affidavit of Aaron Steve Macpherson (signed Jun. 6, 2000)—4 pages.

* cited by examiner

*Primary Examiner*—Peter Vo
*Assistant Examiner*—A. Dexter Tugbang
(74) *Attorney, Agent, or Firm*—Derek J. Berger

(57) ABSTRACT

A method for assembling a mechanical system is disclosed. A magnet is installed into the system. An actuator having a magnetic element is also assembled into the system such that the actuator is movable between two extremes. At one of the extremes, the actuator is latched in place by way of the magnetic element, which forms a magnetic circuit with the magnet.

13 Claims, 7 Drawing Sheets

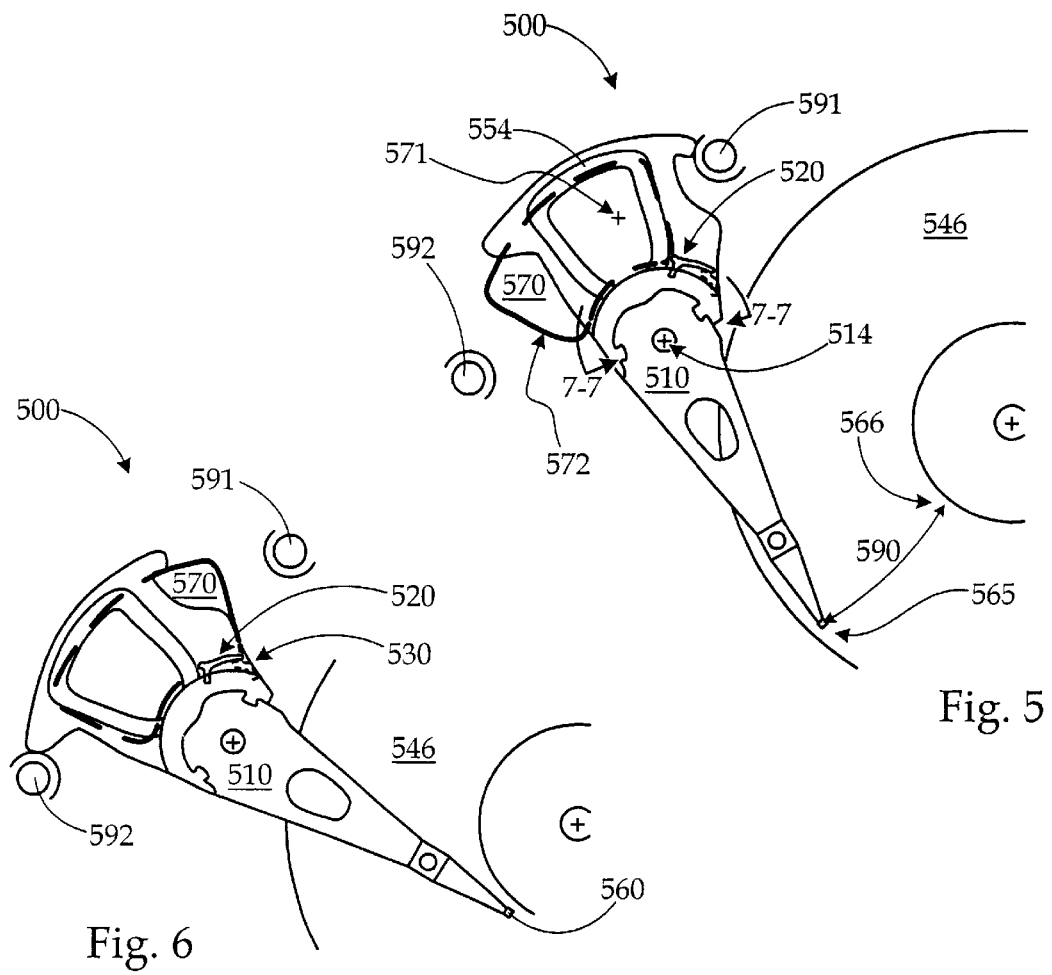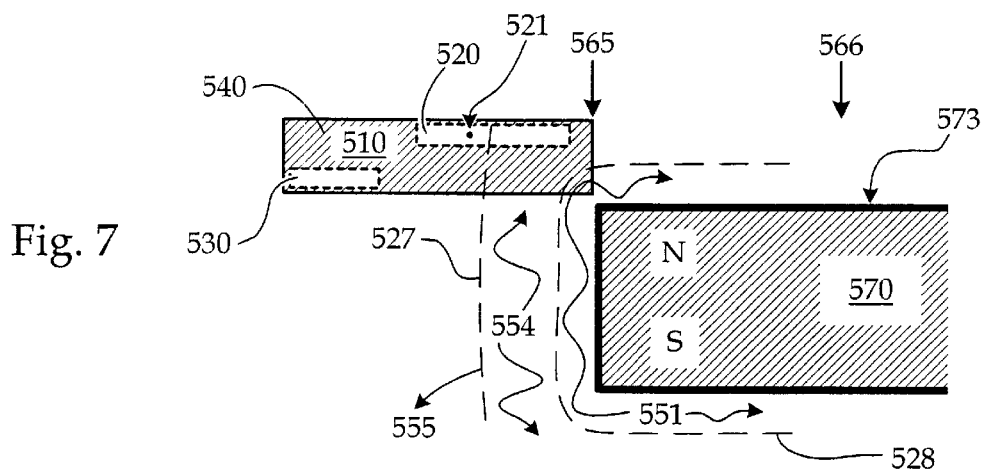

METHOD FOR LATCHING A DISC DRIVER ACTUATOR

RELATED APPLICATIONS

This application claims the benefit of U.S. Provisional Application No. 60/132,993 filed on May 7, 1999.

FIELD OF THE INVENTION

The present invention relates to movable assemblies with fixed ranges of motion, and more particularly to magnetically biasing such an assembly toward one extreme of its range.

BACKGROUND OF THE INVENTION

Some conventional magnetic latches exert significant attraction only at a region near one extreme of the stroke of a movable assembly. See, for example, FIG. 3 of U.S. Pat. No. 5,782,512 ("Magnetic Field Latch Assembly") issued Jul. 21, 1998 to Cargnoni. Magnetic latches sometimes require the use of an additional magnet solely to serve that purpose. See U.S. Pat. No. 5,170,300 ("Magnetic Parking Device for Disk Drive") issued Dec. 8, 1992 to Stefansky. One problem that exists in many latch designs of this type is that the latching force is only exerted over a limited range which could not be extended economically.

More recently, longer-range biasing schemes have been developed that allow a magnetic element (of a magnetically permeable material) to pass into a space of maximum flux density, between the centers of a pair of flat (plate-shaped) magnets. At one extreme of the stroke, only a small portion of the element is between the magnets. At the opposite extreme, the latched position, almost all of the element is between the flat magnets. Throughout the stroke, these devices provide an ample biasing force by having magnetic material just outside of the area between the magnets (i.e. overlapping the fringe). A significant shortcoming of this approach, however, is that magnetic elements traverse regions of high and variable flux gradients throughout the majority of the movably assembly's stroke. Therefore, their biasing effects vary in complex ways that are not easily controlled.

The present invention is directed to the problem of improving magnetic biasing control across an extended range of operation.

SUMMARY OF THE INVENTION

Devices of the present invention provides a mass of magnetic material that is elongated in its direction of travel, the mass preferably having a length at least 2–5 times greater than its width. The mass may be one contiguous piece of magnetic material or may be a plurality of separate pieces. Increments of the mass each traverse a path that is configured to approach a strong magnetic field, inducing attraction, and then travel substantially parallel to or tangent to an edge, so that the attraction does not greatly influence travel along its path. By controlling which material does and does not affect attraction substantially, the present invention extends and controls the force profile of the movable assembly economically.

Devices of the present invention operate with a stationary assembly including at least one magnet having a major surface of one magnetic pole, the surface generating a strong magnetic field in the region adjacent to the surface. A movable assembly is coupled to the stationary assembly to provide one degree of freedom with respect to a stationary assembly. The movable assembly travels within a fixed curvilinear range, mechanisms for which are known in the art. The assemblies are coupled so that, over a first portion of the stroke, magnetic material in the movable assembly travels toward or away from the magnetic field. Over a second portion of the stroke, the same magnetic material travels along an edge of the surface, preferably straddling the edge so that some of the material is directly over the surface. For some increment of the mass of magnetic material, each of these portions preferably extends over at least 10–30% of the stroke.

The magnet may operate singly or in concert with one or more additional magnets to create a gap into which magnetic material of the movable assembly can travel. In either case, certain increments of magnetic material travel along the nearest edge of the primary surface or gap. These increments do not contribute significantly to the attraction acting on the movable assembly, traveling substantially parallel to the isomagnetic lines (isolines). By providing configurations with this property, the present invention reduces the uncertainty that ordinarily necessitates complex modeling and prototyping.

In one embodiment, devices of the present invention can function in two modes. In the first mode, the movable assembly interacts with at least one magnet so that it can latch at one extreme of its stroke. Preferably, magnetic material in the movable assembly overlaps the fringe such that most of the material is outside the fringe throughout the stroke. In the second mode, another magnet is added, the presence of which alters the magnetic field in the path of the magnetic material. In a preferred embodiment, the bias direction is the same throughout the stroke of the movable assembly, irrespective of the presence of the additional magnet.

One method of the present invention for assembling a mechanical system includes latching the movable assembly with as few as one flat magnet. An additional magnet may optionally be added, depending on the desired biasing.

Still another embodiment of the present invention includes a movable assembly with a plurality of discrete elements of magnetic material that are spaced from each other. One subset of the elements can thus have an attraction that dominates the other(s), when the movable assembly is at one end of it stroke. Other features and advantages of the present invention will become apparent upon a review of the following figures and their accompanying description.

BRIEF DESCRIPTION OF THE DRAWINGS

FIG. 5 shows a top view of the disc drive of FIG. 2 with its actuator at an outermost position.

FIG. 6 shows a top view of the disc drive of FIG. 2 with its actuator at an innermost position.

FIG. 7 shows a schematic view of the disc drive of FIG. 2, accurately indicating the relative positions of the first magnet and the actuator's mass of magnetic material.

DETAILED DESCRIPTION

Figure 1:
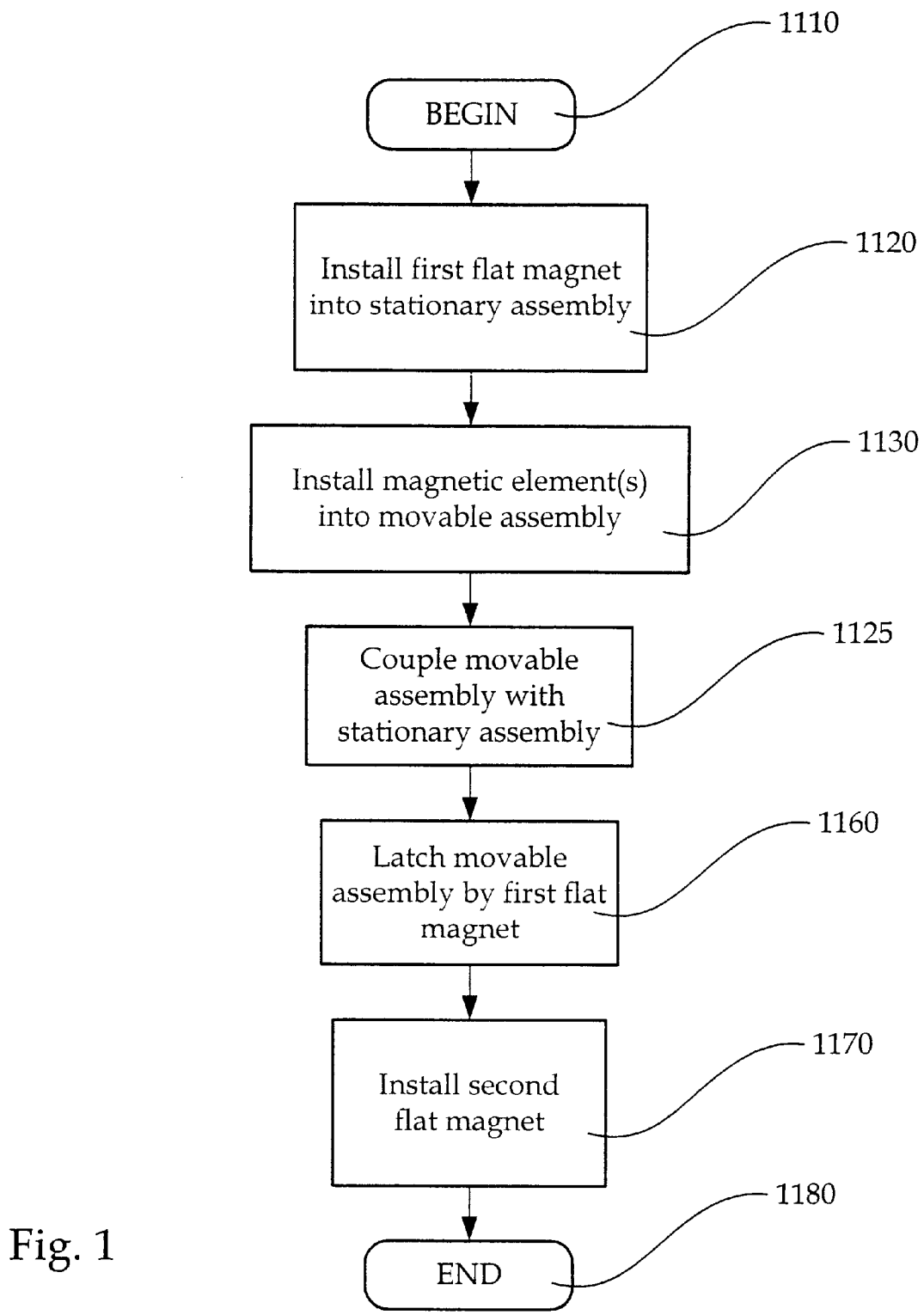
FIG. 1 shows a method of the present invention for assembling a mechanical system having magnetic biasing.

Numerous aspects of magnetic latch technology that are not a part of the present invention (or are well known in the art) are omitted for brevity. These include (1) construction and composition of magnets, magnetically permeable materials, and non-magnetic bodies affixing them; (2) construction of linkages allowing relative movement along curvilinear paths (such as arcs or lines); and (3) force and flux density measurement mechanisms. Although each of the many examples below shows more than enough detail to allow those skilled in the art to practice the present invention, subject matter regarded as the invention is broader than any single example below. The scope of the present invention is distinctly defined, however, in the claims at the end of this document.

Like reference numerals refer to like elements, throughout the following figures and descriptions. Definitions of certain terms are provided in conjunction with the figures, all consistent with common usage in the art but some described with greater specificity. For example, "directly over" a point on the surface as used herein refers to vectors normal to the surface at the point. That is, each point on the surface directly faces points "directly over" it.

"Increments" as used herein refers to contiguous, homogenous portions of material tiny enough to be treated as points. "Elements," by contrast, can be large and/or non-contiguous and of mixed composition. A "magnetic element," however, must have a majority of its volume being a magnetic material.

FIG. 1 shows a method of the present invention comprising steps 1110 through 1180. A first flat magnet is installed 1120 into a stationary assembly such as that of a disc drive. "Stationary" as used herein means "fixed with reference to a primary body on which the first flat magnet is installed" such as a housing base. One or more magnetic element(s) are installed into (i.e. become a part of) the movable assembly 1130. A "magnetic element" as used herein is an object formed in a predefined configuration of magnetic material such as low-carbon steel or some other iron-containing alloy. Preferably, the other elements comprise a plastic body injection-molded around the magnetic element(s) to construct the movable assembly. A bonding agent such as glue can alternatively be used to affix magnetic elements onto the surface of a non-magnetic body. Similarly, the movable assembly is coupled to the stationary assembly 1145.

Once these preliminary steps of installing 1120,1130 and coupling 1125 are complete, the movable assembly is latched 1160 at one extreme of the movable assembly's stroke. Unlike many biasing schemes of the prior art, the latching force is not opposed by the attraction between the first flat magnet and the movable assembly. More preferably, this attraction provides part or all of the latching force so as to maximize latching force economically. The latching force optionally provides a magnetic bias across the movable assembly's entire stroke that is effective to move the movable assembly. More preferably, the biasing force varies by less than an order of magnitude across the entire stroke. This allows the latching step 1160 to be performed automatically, irrespective of the movable assembly's position. In any event, the present method desirably includes installing a second flat magnet 1170 after the latching step 1160.

Figure 2:
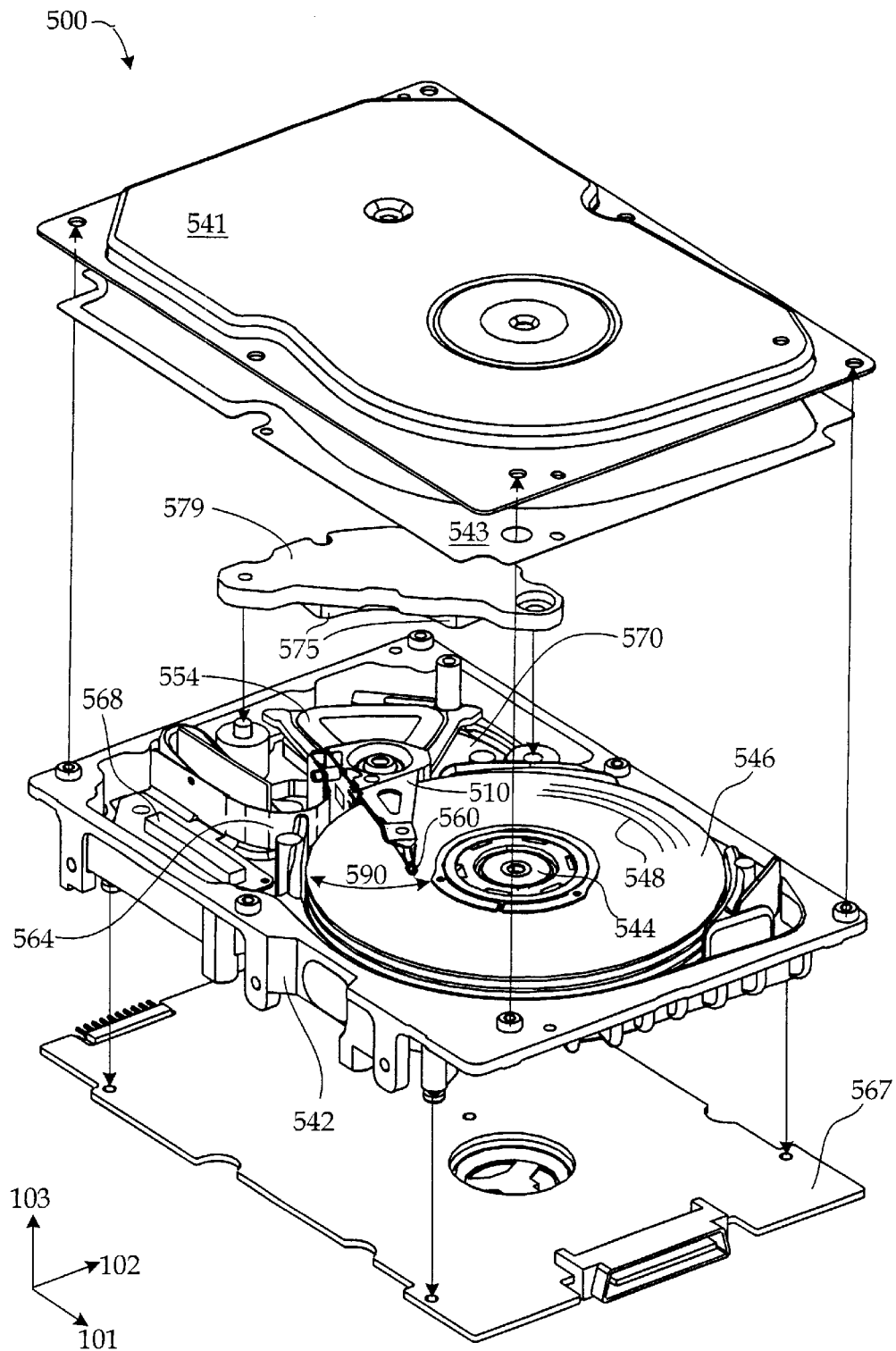
FIG. 2 shows a disc drive assembled according to the present invention, including a movable actuator assembly.

FIG. 2 shows a disc drive 500 assembled according to the present invention, including rotatable actuator assembly 510. Disc drive 500 also includes base 542 and top cover 541, which both engage gasket 543 to form a sealed housing that maintains the clean environment inside disc drive 500. Several discs 546 are mounted for rotation on spindle motor hub 544. Each disc 546 has two horizontal surfaces (i.e., in the plane defined by vectors 101 and 102) that rotate about an axis parallel to vertical vector 103). A plurality of heads 560 is mounted on actuator assembly 510. As depicted, heads 560 are loaded onto annular data tracks 548 of discs 546. The actuator assembly 510 is adapted for pivotal motion under control of a voice coil motor (VCM) comprising voice coil 554 and voice coil magnets 570,575 to controllably move heads 560 to a desired track 548 along an arcuate path 590. VCM magnets 570,575 are sandwiched between magnetically permeable plates 579 that help to concentrate flux. Arcuate path 590 crosses several thousand data tracks 548 between the two extremes of its stroke. Signals used to control the VCM and heads 560 pass via a flex circuit 564 and a connector 568 to and from electronic circuitry on the controller board 567.

Figure 3:
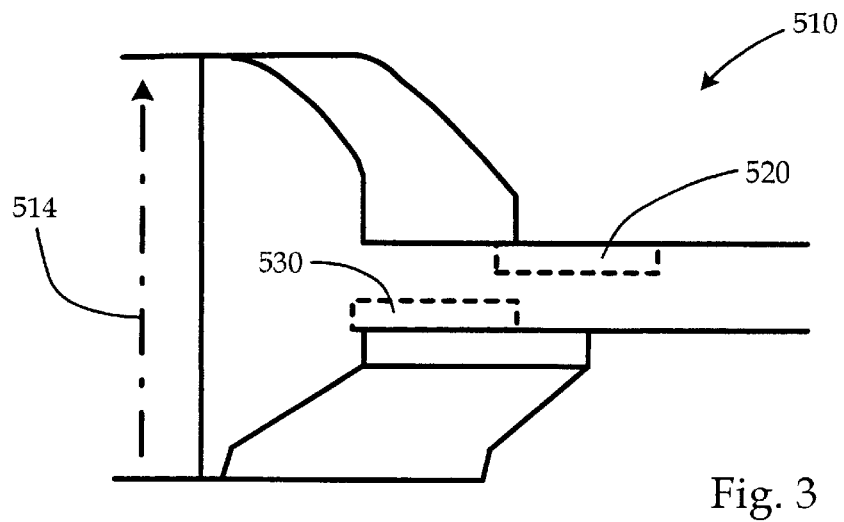
FIG. 3 shows a highly magnified side view of a portion of the actuator assembly of FIG. 2.
Figure 4:
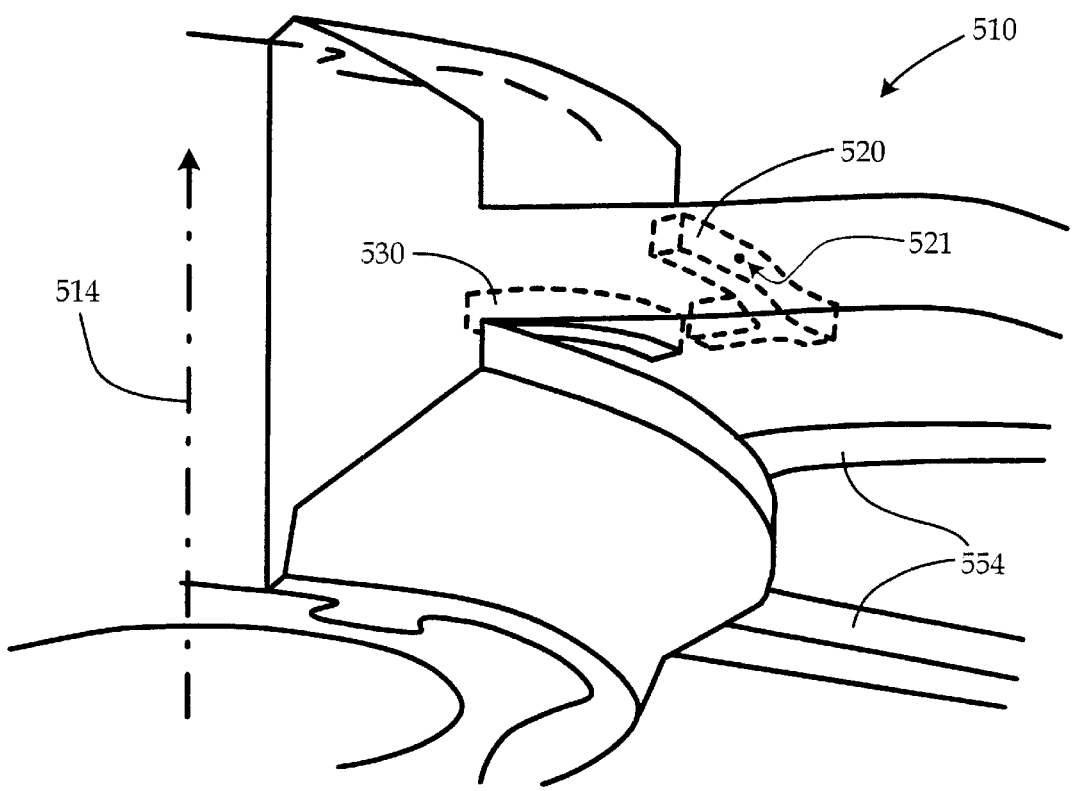
FIG. 4 shows a highly magnified underside oblique view of a portion of the actuator assembly of FIG. 2.

FIGS. 3 & 4 show a highly magnified side view and underside oblique view, respectively, of a portion of actuator assembly 510 of FIG. 2. Actuator assembly 510 rotates within a limited angular range about axis 514 in response to any of several forces such as magnetic interaction between magnetic elements 520, 530 and first voice coil magnet 570. Actuator assembly may also be acted upon by forces from currents in voice coil 554, friction, air flow effects from rotating discs 546, non-linear bias from flex circuit 564, magnetic interaction with second voice coil magnet 575, or any of several other forces. An "increment" 521 of magnetic element 520 is also illustrated.

FIGS. 5 & 6 show top views of disc drive 500 with its actuator assembly 510 at an outermost position 565 (highest potential energy) and an innermost position 566 (lowest potential energy), respectively. First voice coil magnet 570 is installed into disc drive 500. Magnetic elements 520,530 are installed into actuator assembly 510, which is supported in drive 500 to allow rotation with respect to first voice coil magnet 570. Voice coil magnet 570 includes two equal-sized segments adjoined along plane extending through axis 514. Each of these segments is a magnet having poles perpendicular to FIG. 5. Each of these segments also has a center 571 through which flux density is maximized in the completed assembly of disc drive 500 of FIG. 2. Each of these segments also has an edge 572 defining its outer bounds. Note that in FIG. 5, second voice coil magnet 575 is not yet installed. The configuration of FIG. 5 is thus consistent with the method of FIG. 1 prior to step 1160 of latching the movable assembly.

Recall from FIGS. 2–4 that heads 560 travel along a generally radial arcuate path 590 across discs 546 as actuator assembly 510 rotates about axis 514. At the outermost position 565, as indicated in FIG. 5, the range of rotation is limited by the actuator assembly 510 being in contact with first stop 591. At the innermost position 566, as indicated in FIG. 6, the range of rotation is limited by the actuator coming into contact with second stop 592. In the transition between the outermost position 565 of FIG. 5 and the innermost position 566 of FIG. 6, magnetic elements 520, 530 pass above voice coil magnet 570, which attracts them. If all of the other torques acting upon actuator assembly 510 are sufficiently small, the innermost position 566 of FIG. 6 will be a position of minimum mechanical potential energy. The innermost position 566 is thus a latched position. FIG. 6 indicates a configuration consistent with the method of FIG. 1 after step 1160 of latching the movable assembly.

Of course, it is also contemplated that the actuator 510 may be installed into the drive 500 oriented such that the head 560 is at its innermost position 566 as shown in FIG. 6, such that assembly of the actuator 500 and latching thereof are accomplished simultaneously.

FIG. 7 shows a circumferential cross-sectional view showing the relative positions of voice coil magnet 570 and magnetic elements 520,530 at the actuator assembly's outermost position 565. The cross section is taken along an arc about axis 514 indicated by reference marks 7—7 of FIG. 5. The magnetic elements 520,530 are drawn in dashed lines to indicate that they are within the arc indicated by reference marks 7—7. The drawing is approximately to scale, except that the shape of the non-magnetic body 540 of actuator assembly 510 is schematic. This does not affect latching operation, however, which is dominated by the interplay between magnetic elements 520,530 and magnet 570.

Recall from FIGS. 5 & 6 that the actuator assembly moves from outermost position 565 to innermost position 566. In FIG. 7, this corresponds to the right edge of actuator assembly 510 moving from outermost position 565 to innermost position 566, from left to right. FIG. 7 also shows the approximate position of isoline 528, an isomagnetic contour defined by the field generated by voice coil magnet 570.

Suppose, for purposes of understanding isoline 528, that the maximum flux density gradient generated by magnet 570 has a magnitude M. Isoline 528 is then defined as the set of points along which the flux density gradient is M/2, absent any large magnetic objects near magnet 570. For example, a gaussmeter can be used to ascertain that magnet 570 has a maximum flux density gradient of 600 gauss per centimeter. At all points within isoline 528, outside magnet 570, flux density will therefore be greater than 300 gauss/cm. For this reason, this innermost region will herein be referred to as "steep" region 551.

A second isoline 527 is drawn along a contour having a flux density gradient equal to M/100. Outside isoline 527 is a "uniform" region 555 having a flux density gradient less than 6 gauss/cm. Between steep region 551 and uniform region 555 is "transition region" 554 within which flux density gradients are between M/100 and M/2. An increment of magnetic material affects the attraction force most strongly if it is in transition region 554 and can move toward or away from the magnet 570 by a motion less than about 1% of the length of its stroke. The portion of magnetic element 520 that is within the uniform region 555 is not in the transition region 554, for example, and thus has a negligible effect upon the attraction force. FIG. 7 also shows a major surface 573 of a (north) pole of magnet 570. The major surface 573 is perpendicular to axis 514 and substantially parallel to the path traversed by the actuator assembly 510.

Figure 8:
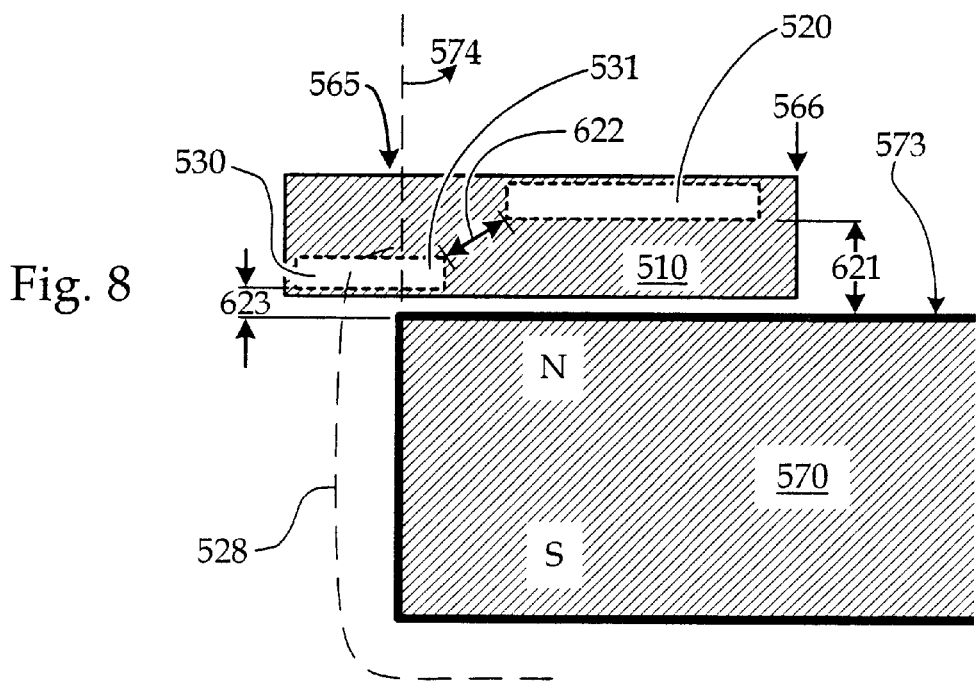
FIG. 8 shows a similar view to FIG. 7, showing actuator assembly at its innermost position following a latching operation.

FIG. 8 shows with specificity a region 574 directly above the surface 573. Actuator assembly 510 is shown with a maximum amount of its magnetic material in region 574, with the assembly 510 at its (latched) innermost position 566. None of element 520 can move toward or away from the magnet 570 by a small horizontal motion, so its effect on the horizontal force exerted on the actuator assembly 510 is therefore negligible near the latched position.

Some magnetic material (element 520) is separated from the surface 573 by a height 621 (denoted as H). Other magnetic material (element 530) is separated from the surface by a height 623 that is at least 20% smaller (i.e. less than 0.8H). The two portions of magnetic material are separated by a distance 622, moreover, that is within an order of magnitude of H. Regardless of the composition or shape of the portions, these relationships are preferred for effective latching near one end of the movable assembly's range of motion.

Figure 9:
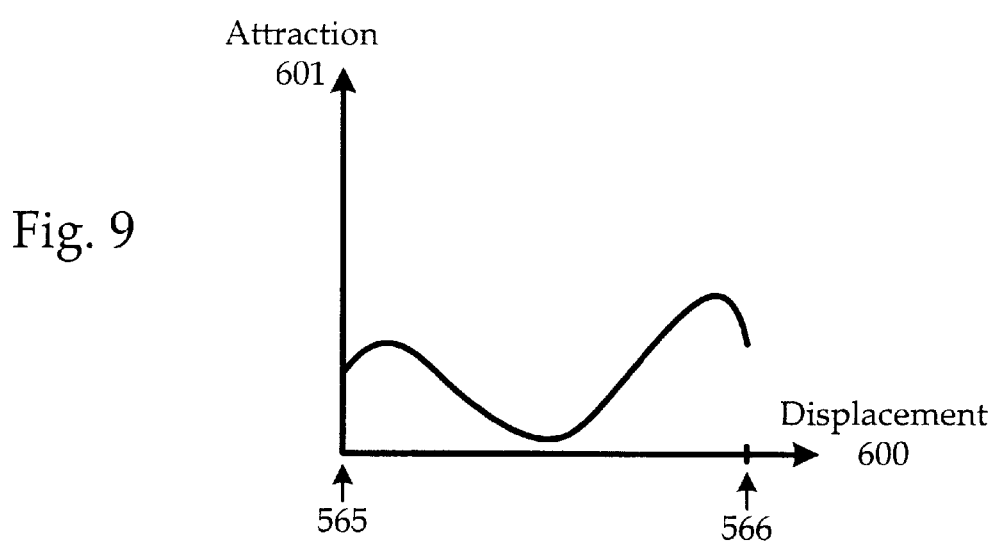
FIG. 9 shows a plot of attraction force versus displacement between the extremities of FIGS. 7 & 8.

FIG. 9 shows a plot of attraction force 601 (urging the actuator assembly toward latched position 566) versus displacement 600 of actuator assembly 510. Attraction force 601 will resemble this contour irrespective of whether displacement 600 is indexed in degrees or millimeters. As actuator assembly 510 advances from position 565 to 566, attraction force 601 is initially dominated by magnetic element 520, which is initially much closer as shown in FIG. 7. As a larger portion of element 520 enters the transition region, attraction briefly increases to a maximum. Attraction force 601 then tapers down as increments of magnetic material on its right-most end stop growing nearer to surface 573. As element 530 enters the transition region 554, attraction force 601 increases again. As a portion of element 530 enters the steep region, attraction force 601 decreases again. In many applications, of course, it may be desirable to use more than two elements, or to vary their radial and vertical shape. A key figure of merit, for each value of displacement, is the amount of material that is in the transition zone and traveling toward or away from the magnet.

Figure 10:
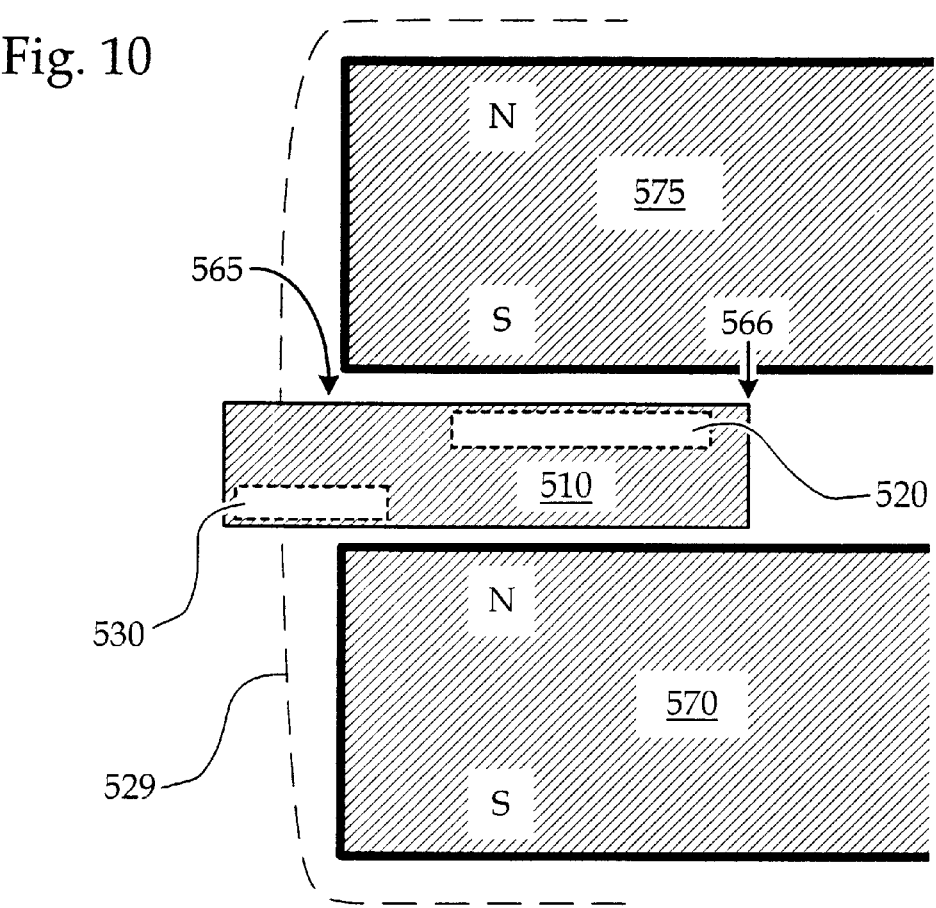
FIG. 10 shows the configuration of FIG. 8, modified by the addition of a second magnet.
Figure 11:
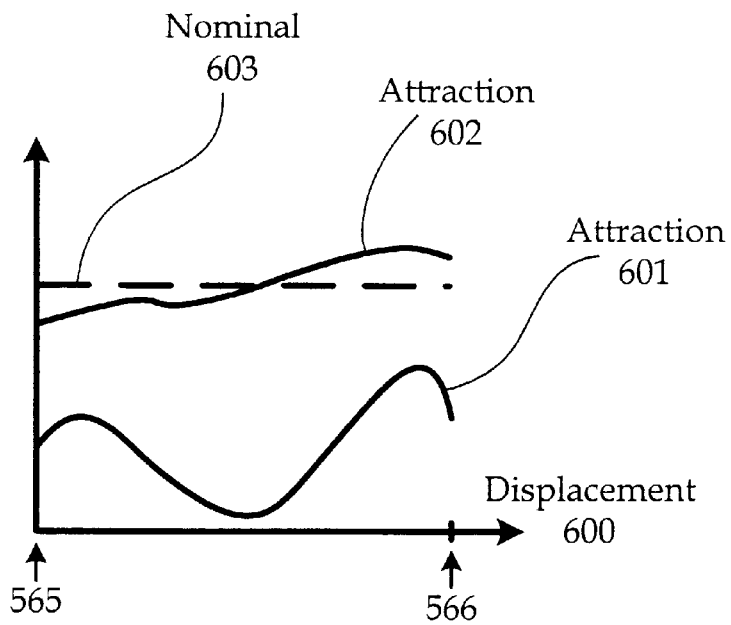
FIG. 11 shows a plot of attraction force versus displacement as modified by the second magnet.

FIG. 10 shows the configuration of FIG. 8, modified by the addition of second voice coil magnet 575. This modification significantly changes the magnetic field, as indicated by the M/2 isoline 529. FIG. 11 shows the attraction force 602 as a function of displacement of the system of FIG. 10. For comparison, the attraction 601 is plotted against the same horizontal axis of displacement 600. The most pronounced difference between the single-magnet attraction force 601 and the two-magnet attraction force 602 occurs about mid-way between the outermost position 565 and the innermost position 566. The installation of magnet 575 causes a biasing force on the actuator assembly 510 that is substantially constant as a function of displacement—i.e. varies by less than about 20% from nominal force value 603. That a biasing force be substantially constant is a significant benefit in many contexts, especially in disc drive actuator control.

Figure 12:
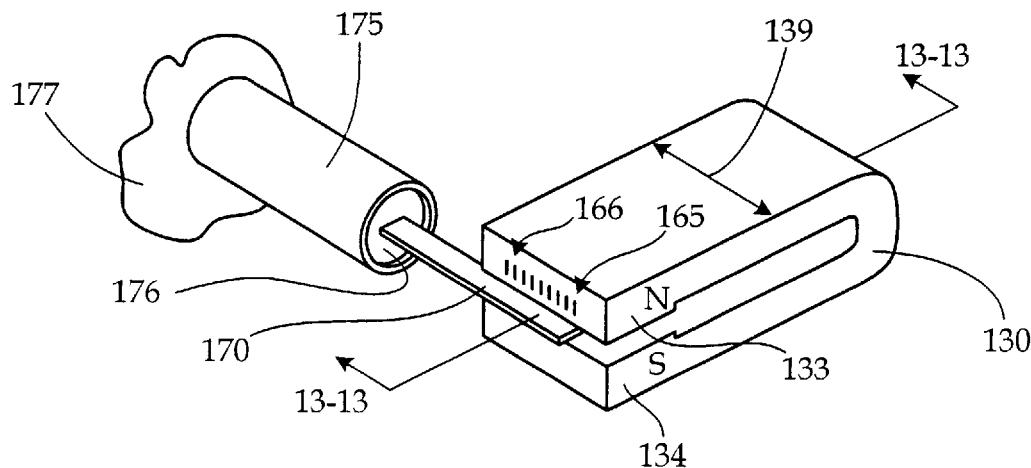
FIG. 12 shows an oblique view of a device of the present invention applied to implement a pressure threshold detector.

FIG. 12 shows an oblique view of a device of the present invention applied to implement a pressure threshold detector for vessel 177, which may contain a partial vacuum. Vessel 177 is in fluid contact with the interior of cylinder 175. In addition to vessel 177, the stationary elements of FIG. 12 include magnet 130 with poles 133,134 and width 139.

The movable assembly of FIG. 12 includes non-magnetic piston 176 and blade 170, which contains a magnetic material such as iron. Piston 176 interacts with cylinder 175 so that the movable assembly moves within a range of motion bounded by two extremes. At one extreme, near the depicted position, blade 170 extends directly below the right-most tick mark (position 165). At the other extreme, blade 170 is partially withdrawn from between the poles of magnet so that blade 170 only extends to left-most tick mark (position 166). Due to the attraction of magnet 130 to the magnetic material in blade 170, this withdrawal requires energy such as may be provided by evacuating vessel 177. View 13—13 is a cross-section bisecting magnet 130 longitudinally.

Figure 13:
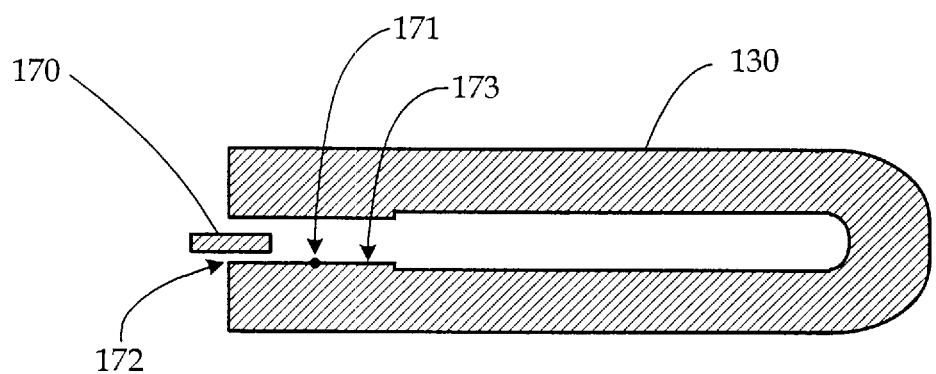
FIG. 13 shows the magnet and blade of the device of FIG. 12.

FIG. 13 shows magnet 130 and blade 170 in cross-section, perpendicular to the movable assembly's direction of motion. The south pole 134 of magnet 130 has a primary surface 173 with a center 171 and an edge 172. Edge 172 is shown square in FIGS. 12 & 13 but can, of course, be rounded horizontally or vertically.

Although measurements are not required for the practice of the present invention, flux density can be measured conveniently with a gaussmeter or other suitable commercially-available magnetometer, such as may be purchased from Less EMF Inc. of Ghent, N.Y. (USA) at the time of this writing. For a description of magnetometer operation, see U.S. Pat. No. 4,324,255 ("Method and Apparatus for Measuring Magnetic Fields and Electrical Currents in Biological and Other Systems") issued Apr. 13, 1982 to Barach et al. Magnetometers can aid in the practice of applying the present invention to characterize the flux density distribution near a magnet assembly having a poorly understood flux distribution.

One embodiment of the present invention provides a movable assembly (such as 510) configured to interact with a magnetic field generated by a stationary magnet (such as 170 or 570). The assembly includes a non-magnetic body (such as 176 or 540) configured to move within a curvilinear range of motion bounded by two extreme positions (such as 565 & 566). The assembly also includes magnetic material coupled to the body (i.e., in or on the body). A first subset (A) of the plurality (such as 520) is configured to travel along a stroke so that it is separated from the magnet by some minimum distance (H). A second, non-intersecting subset (B) of the plurality (such as 530) is separated from the magnet by a minimum distance less than 0.7 of H. Subsets A and B are separated by a minimum distance of at least 0.1 H.

A second embodiment of the present invention also provides a movable assembly 510 for interacting with a magnetic field generated by a stationary magnet 570. The magnet 570 has at least one pole with a major surface defining a region with a magnetic field directly above the surface. The movable assembly 510 includes a substantially non-magnetic body 540 (having less than 1% magnetic material by volume which experiences a negligible attraction). The assembly 510 is configured to move within a curvilinear range of motion bounded by two extreme positions 565,566. Magnetic material (such as low-carbon steel in magnetic element 530) is coupled to the body 540, a first portion of which is positioned so that it can enter and leave the region as the body traverses the range (see FIGS. 7 & 8). Preferably, the first portion travels substantially parallel (within about 10 degrees) to the contour of an edge of the surface whenever any of the first portion is in the region.

For predictability, the range of motion of the movable assembly 510 is desirably limited so that the first portion cannot travel over the center point of the surface as the body 540 traverses the range. For better control of latching force 601 in the presence of a second magnet 575, the magnetic material of the movable assembly 510 also includes a second portion 520 not intersecting with the first portion with dimensions similar to those of FIG. 8.

All of the structures described above will be understood to one of ordinary skill in the art, and would enable the practice of the present invention without undue experimentation. It is to be understood that even though numerous characteristics and advantages of various embodiments of the present invention have been set forth in the foregoing description, together with details of the structure and function of various embodiments of the invention, this disclosure is illustrative only. Changes may be made in the details, especially in matters of structure and arrangement of parts within the principles of the present invention to the full extent indicated by the broad general meaning of the terms in which the appended claims are expressed. For example, the particular elements may vary depending on the particular application for the present system while maintaining substantially the same functionality, without departing from the scope and spirit of the present invention. In addition, although the preferred embodiments described herein are largely directed to configurations with stationary magnets, it will be appreciated by those skilled in the art that the teachings of the present invention can be applied to equivalent biasing schemes with movable magnets without departing from the scope and spirit of the present invention.

What is claimed is:

1. A method of assembling a mechanical system comprising steps of:
   (a) installing a first magnet into the system;
   (b) installing an actuator assembly having a first magnetic element and a range bounded by two extremes; and
   (c) latching the actuator assembly at one of the extremes by forming a magnetic circuit including the first magnet and the first magnetic element;
   (d) installing a second magnet into the system so that some of the first magnetic element is between the magnets, after latching step (c).

2. The method of claim 1 in which steps (b) and (c) are performed simultaneously.

3. The method of claim 1 in which the latching step (c) includes positioning the first magnetic element to straddle an edge of the first magnet.

4. The method of claim 1 in which the installing step (b) comprises constructing the actuator assembly by injection-molding a plastic body around the first magnetic element.

5. The method of claim 1 in which the mechanical system is in a disc drive having at least one head and at least one innermost head position, and in which step (c) of latching includes positioning the at least one head at the innermost head position.

6. The method of claim 1 in which the mechanical system is in a disc drive having at least one crash stop, and in which step (c) of latching includes positioning the actuator assembly in contact with the crash stop.

7. The method of claim 1, in which the first magnet has a pole with a major surface, in which the first magnet generates a field in a region above the major surface, and in which the first magnetic element has a first portion able to enter or leave the region as the actuator assembly traverses the range.

8. The method of claim 7 in which the first portion travels along and substantially parallel to an edge of the major surface whenever any of the first portion is in the region.

9. The method of claim 7, in which the surface has a center point and in which the first portion of the magnetic element cannot travel directly over the center point as the body traverses the range.

10. The method of claim 7 which the magnetic element further includes a second portion not intersecting with the first portion, the second portion separated from the surface by a minimum distance H, the first portion separated from the surface by a minimum distance less than 0.7H and from the second portion by a minimum distance greater than H/b.

11. The method of claim 7 in which the first magnetic element is a contiguous piece of an iron-containing alloy.

12. The method of claim 7, the at least one magnetic element including a magnetic increment, the increment traveling along a path as the actuator assembly traverses the range, the path having a length, at least 10% of the length being within a transition zone of the first magnet.

13. The method of claim 1 in which the mechanical system is in a disc drive, the disc drive including a transducer head and a disc with a data surface accessible by the transducer head across most of the range of the actuator assembly, the transducer head being separate from the disc after the latching step (c).

* * * * *